(12) United States Patent
Nose et al.

(10) Patent No.: US 7,084,890 B2
(45) Date of Patent: Aug. 1, 2006

(54) RECORDING DEVICE AND RECORDER

(75) Inventors: Masaki Nose, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/077,468

(22) Filed: Mar. 10, 2005

(65) Prior Publication Data
US 2005/0162500 A1 Jul. 28, 2005

Related U.S. Application Data

(63) Continuation of application No. PCT/JP03/00732, filed on Jan. 27, 2003.

(51) Int. Cl.
B41J 2/447 (2006.01)
B41J 2/45 (2006.01)
G02F 1/135 (2006.01)

(52) U.S. Cl. ........................ 347/130; 349/25
(58) Field of Classification Search ............... 347/129, 347/130
See application file for complete search history.

(56) References Cited

U.S. PATENT DOCUMENTS

| 6,040,880 | A | 3/2000 | Tsuboi et al. | |
| 6,774,880 | B1 * | 8/2004 | Kobayashi | 345/84 |
| 6,882,355 | B1 * | 4/2005 | Kobayashi | 347/111 |
| 2002/0012042 | A1 * | 1/2002 | Kobayashi et al. | 347/239 |

FOREIGN PATENT DOCUMENTS

| EP | 0 402 944 | 12/1990 |
| JP | 1-106467 | 4/1989 |
| JP | 1-211719 | 8/1989 |
| JP | 3-020720 | 1/1991 |
| JP | 04-9964 | * 1/1992 |
| JP | 04-073615 | * 3/1992 |
| JP | 4-199138 | 7/1992 |
| JP | 6-507505 | 8/1994 |
| JP | 9-105900 | 4/1997 |
| JP | 10-171017 | 6/1998 |
| JP | 2000-111942 | 4/2000 |
| JP | 2000-347225 | * 12/2000 |
| WO | WO 92/19695 | 11/1992 |

OTHER PUBLICATIONS

Yamamoto et al., "A Novel Photoaddressable Electronic Paper Utilizing Cholesteric LC Microcapsules and Organic Photoconductor", SID 01 Digest, pp. 362-365.*

(Continued)

Primary Examiner—Huan Tran
(74) Attorney, Agent, or Firm—Greer, Butns & Crain, Ltd.

(57) ABSTRACT

A recording device comprises a display, a photoconductor superposed on the display, and a pair of electrodes disposed on both sides of the display and photoconductor. At least one of the electrodes is divided into sub-electrodes. Information can be written into the recording device by means of light while applying a voltage to each sub-electrode. Therefore, information is not written into part of the recording device corresponding to the sub-element to which no voltage is applied even if extraneous light is applied. As a result a sharp image with no noise can be formed. The recording device also comprises a feed member for applying a voltage to a pair of electrodes of such a recording device, a first light source for writing information in the recording device, and a second light source for reset. Consequently, reset and recording can be done in one cycle.

18 Claims, 17 Drawing Sheets

OTHER PUBLICATIONS

Yoshida et al.; "Reflective Display with Photoconductive Layer and a Bistable. Reflective Cholesteric Mixture": SID 96 Applications Digest; pp. 59-62; 1996.

Ohnishi et al.; "Electrophoretic Image Display (EPID) Panel"; Proceedings of the IEEE, vol. 61. No. 7: pp. 832-836: Jul. 1973.

Comiskey et al.; "An Electrophoretic Ink for All-printed Reflective Electronic Displays"; Letters to Nature, Vo. 394: pp. 253-255: Jul. 16, 1998.

Sheridon et al.; "The Gyricon—A Twisting Ball Display"; Proceeding of the SID. vol. 18/3 & 4: pp. 289-293: 1977.

* cited by examiner

PLANAR STATE

FOCAL CONIC STATE

RECORDING DEVICE AND RECORDER

CROSS-REFERENCE TO RELATED APPLICATION

This application is a continuation application and is based upon PCT/JP03/00732, filed on Jan. 27, 2003.

BACKGROUND OF THE INVENTION

1. Field of the Invention

The present invention relates to a recording device suitable for use as, for example, electronic paper and a recorder.

2. Description of the Related Art

In recent years, information input means including a scanner and a digital camera, display devices including a monitor, and information output means including a printer have been used diversely along with the development of electronic information equipment. Information can be read directly from a display device such as a monitor. However, the display device such as a monitor is generally of an emissive type and therefore fatigues viewer's eyes. Moreover, since the resolution offered by the display device is not very high, direct reading of a document or still image from the display device such as a monitor may not be desired. Therefore, information recorded in electronic information equipment is often printed onto paper in order to read the information on the paper.

When information is printed onto paper and then read, the information on the paper is read by receiving reflected light. This little fatigues reader's eyes. Since the resolution offered by a printout is considerably high, the printout is highly discernible. Consequently, many users print a document, which is displayed on a monitor, onto paper so as to read the document.

However, the use of paper imposes a large load on an environment. Talking of the use situation of paper, for example, as soon as a received e-mail message is printed onto paper and read, the paper is disposed of. Thus, the paper is rather wasted.

Moreover, when a printer is used to produce a hardcopy of a document or an image, if the printer is an ink-jet printer, not only paper but also inks of primary colors such as cyan, magenta, and yellow, or of more colors are consumed. If the printer is a laser printer or an LED printer, toners of many colors are consumed. The use of the consumables required for printout onto paper imposes a large load on an environment.

A rewritable (re-recordable) type recording device called electronic paper has been proposed and under development. For example, an electrophoretic recording device, a twisted-ball type recording device, and a selective reflection type recording device employing a cholesteric liquid crystal have been proposed as reflective recording devices that have the capability of a memory.

The electrophoretic recording device has been disclosed in, for example, the proceedings of the IEEE (Vol. 61, No. 7, July 1973) or Nature (Vol. 394, No. 16, July 1988). The twist ball type recording device has been disclosed in, for example, the proceedings of the SID (Vol. 18, 3rd and 4th Quarters, 1977, p. 289).

The operation of selective reflection of the cholesteric liquid crystal was discovered from a cholesterol derivative in 1688. Moreover, a ferroelectric (smectic) liquid crystal is known to have the capability of a memory.

Japanese Translation of PCT International Application No. 6-507505 has disclosed a liquid crystal cell having chiral nematic liquid crystalline molecules dispersed in the network of a polymer. One form of the liquid crystal cell allows a liquid crystal to become reflective or transmissive (diffusible), and the liquid crystal is stable with a zero voltage in both the reflective and transmissive states.

Japanese Unexamined Patent Application Publication No. 9-105900 has disclosed an optically writable projection liquid crystal display device including a spatial modulator that has a photoconductive layer and a liquid crystal layer. Light is irradiated to the photoconductive layer, whereby information is written in the liquid crystal layer.

A recording device composed of a photoconductive layer and a cholesteric liquid crystal has been disclosed in "Reflective Display with Photoconductive Layer and Bistable Reflective Cholesteric Mixture" (SID 96 Applications Digest, p. 59). The recording device is used as a screen capture that is mounted on the screen of a personal computer in order to copy a screen image on the personal computer. Since the recording device preserves the copied screen image as if to be a memory, no power is consumed. Recording and deletion are achieved instantaneously.

Moreover, electronic paper composed of a photoconductive layer and a cholesteric liquid crystal has been disclosed in the collection of theses "Japan Hardcopy 2000" (p. 93–96).

The electronic paper obviates the necessity of a printer and paper, and is therefore inexpensive. Moreover, the electronic paper imposes no load on an environment. However, the recording devices that write information using light are susceptible to noise caused by extraneous light and likely to produce unclear images.

SUMMARY OF THE INVENTION

An object of the present invention is to provide an optically writable recording device that is inexpensive and highly reliable and a recorder for recording information in the recording device.

A recording device in accordance with the present invention comprises a display, a photoconductor superposed on the display, and a pair of electrodes disposed on the display and photoconductor respectively. At least one of the pair of electrodes is divided into a plurality of sub-electrodes.

At least one of the pair of electrodes is divided in to a plurality of sub-electrodes. While a voltage is applied to each of the sub-electrodes, information is written using light. Even if extraneous light falls on part of the recording device corresponding to the sub-electrodes to which no voltage is applied, no information is written. Consequently, a sharp image devoid of noise is produced. According to the present invention, there is provided an optically writable recording device that is inexpensive and highly reliable.

When an electrode is divided in to a plurality of sub-electrodes, a border between adjoining sub-electrodes is visualized as a streaky image on a display surface. Preferably, the opposite ends of adjoining sub-electrodes are curved as randomly as possible so that the streak will be unobtrusive. Moreover, an electric field, which is regarded as a vector, induced between the pair of electrodes may be made oblique to the surface of a substrate.

A recorder in accordance with the present invention records information in a recoding device comprising a display, a photoconductor superposed on the display, and a pair of electrodes disposed on the display and photoconductor respectively. The recorder comprises feed members via which a voltage is applied to the pair of electrodes included in the recording device, a first light source required for writing of information in the recording device, and a second light source required for resetting a record in the recording device.

Among the above components, the first light source generates light that flickers according to a signal and with which information is recorded in the recording device. The second light source is used to initialize the recording device. Consequently, the one recorder can smoothly perform both recording and reset.

For example, the first light source is realized with an LED array having LEDs disposed linearly or a laser that flickers light linearly. The second light source is realized with any of a light source composed of an LED that generates light on a planar basis or in a wide range and a light guide, or a light source compose of an electroluminescent (EL) lamp or a fluorescent lamp and a light guide. Preferably, the first light source and/or second light source have a light adjustment ability to adjust the intensity of light.

The recorder in accordance with the present invention including the LED array and planar light source does not, unlike a printer, include a mechanism for fusing ink or toner onto paper but records information in the recording device merely by controlling light and electricity. Various members included in the printer are unnecessary. A low cost and a drastically compact design can be realized.

Since the recording device is rewritable (re-recordable), the recording device will not, unlike conventional devices, consume a large amount of paper. The recording device has the capability of a memory to preserve a record even with no power fed. Therefore, the power consumption is small and a load on an environment is drastically reduced. Among the diverse types of recording devices serving as electronic paper, a type of recording device employing a cholesteric liquid crystal has potentials for greater brightness, a higher contrast, and a higher resolution.

DESCRIPTION OF THE PREFERRED EMBODIMENTS

Figure 1:
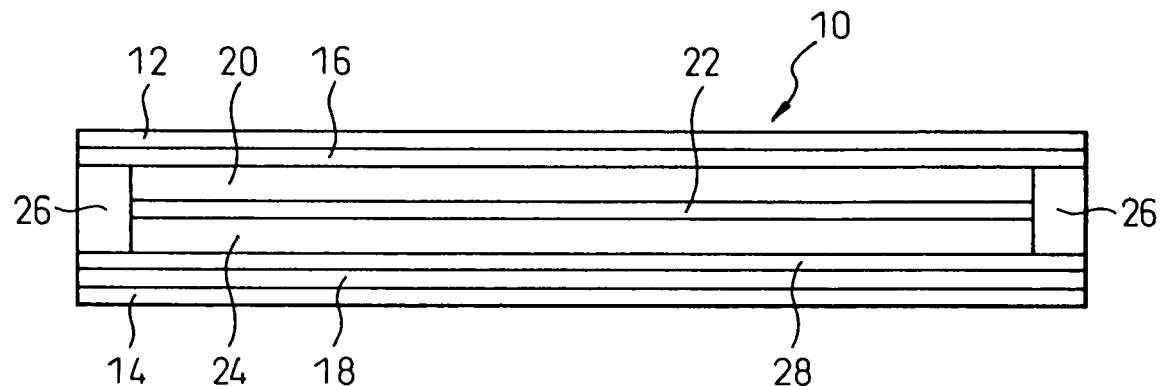
FIG. 1 is a sectional view showing a recording device in accordance with an embodiment of the present invention.

FIG. 1 is a sectional view showing a recording device in accordance with an embodiment of the present invention. Referring to FIG. 1, a recording device 10 comprises transparent substrates 12 and 14, transparent electrodes 16 and 18 formed on the substrates 12 and 14 respectively, a display layer 20, and a photoconductive layer 24 superposed on the display layer 20 with a partition layer 22 between them. The electrodes 16 and 18 are disposed on the display layer 20 and photoconductive layer 24 respectively. The display layer 20 and photoconductive layer 24 are sealed with a sealant 26. Furthermore, an optical absorption layer 28 is sandwiched between the photoconductive layer 24 and electrode 16. The partition layer 22 prevents mixture of the display layer 20 and photoconductive layer 24. The partition layer 22 may be realized with an optical absorption layer. The partition layer 22 is preferably made of a material exhibiting as high a permittivity as possible in order to prevent a driving voltage to rise, but is not limited to any specific material.

Figure 2:
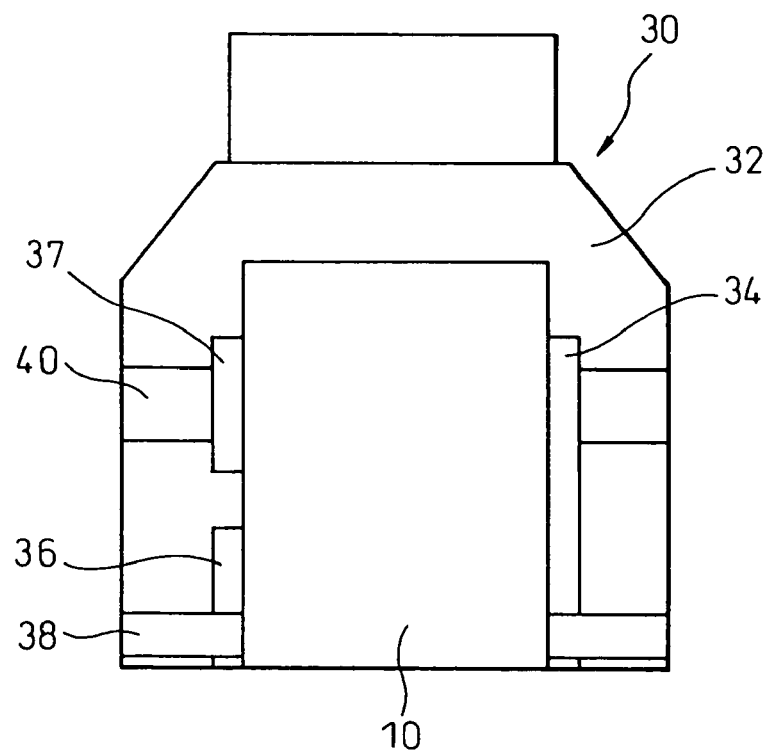
FIG. 2 schematically shows a recorder in accordance with the embodiment of the present invention.

FIG. 2 schematically shows a recorder in accordance with the embodiment of the present invention. A recorder 30 records information in the recording device 10 shown in FIG. 1. Referring to FIG. 2, the recorder 30 comprises a casing 32 in which the recording device 10 is supported or disposed, feed members 34, 36, and 37 via which a voltage is applied to the pair of electrodes 16 and 18 of the recording device 10, a first light source 38 for writing information in the recording device 10, and a second light source 40 for resetting a record produced in the recording device 10. The feed members 34, 36, and 37 are connected to a power supply that is not shown.

Figure 3:
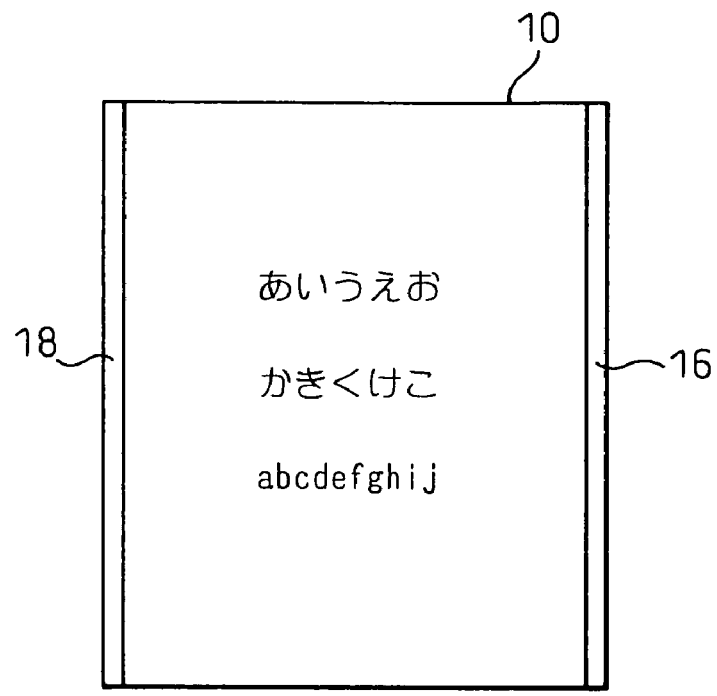
FIG. 3 is a plan view showing the recording device in which information is recorded.

FIG. 3 is a plan view showing the recording device 10 in which information is recorded. The information is recorded in the form of, for example, characters or an image.

Figure 4:
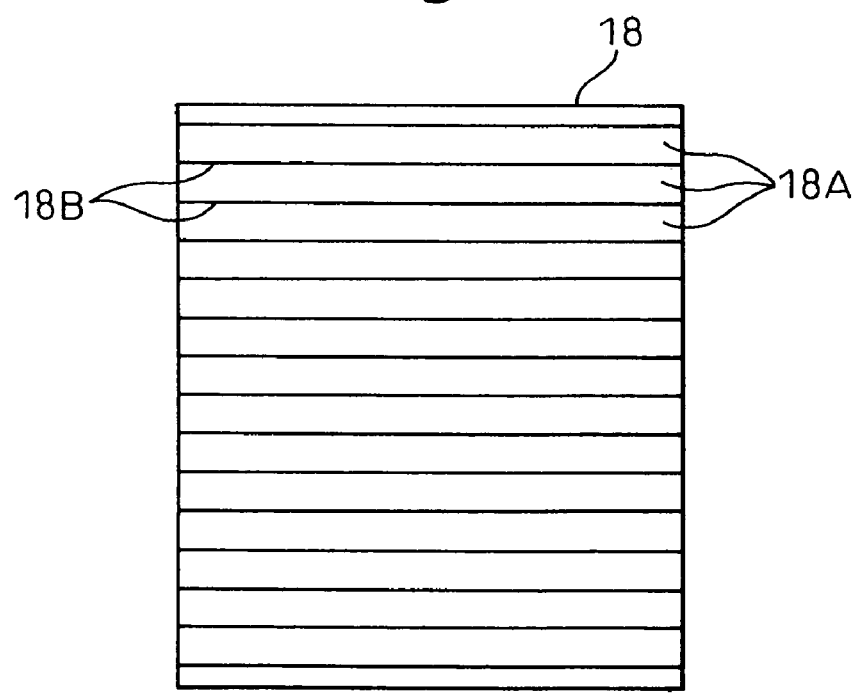
FIG. 4 is a plan view showing electrodes included in the recording device.

FIG. 4 is a plan view showing the electrode 18 included in the recording device 10. The electrode 18 is divided into a plurality of sub-electrodes 18A. The sub-electrodes 18A are shaped like stripes. Preferably, the width of the sub-electrodes 18A is equal to or larger than 1 cm. A microscopic gap 18B is interposed between two adjoining sub-electrodes 18A. Preferably, the gap 18B is equal to or smaller than 50 μm. Since the gap 18B is as small as 50 μm or less, the gap 18B will not be discerned as a streak in a screen image.

Figure 5:
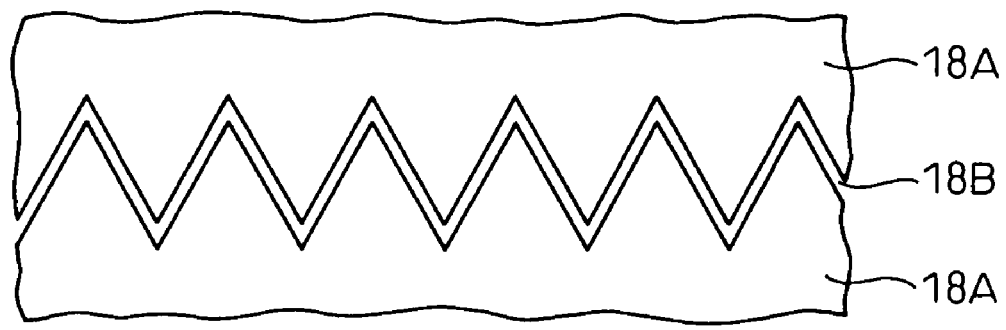
FIG. 5 is a plan view showing electrodes included in a variant of the recording device.

FIG. 5 is a plan view showing the electrode 18 included in a variant of the recording device 10. Referring to FIG. 5, the electrode 18 is divided into a plurality of sub-electrodes 18A. The opposite ends of the sub-electrodes 18 are curved (or zigzagged). The opposite ends of the sub-electrodes 18A (that is, the gap 18B) are shaped as randomly as possible, whereby the gap 18B is prevented from being discerned as a streak in a screen image.

Figure 6:
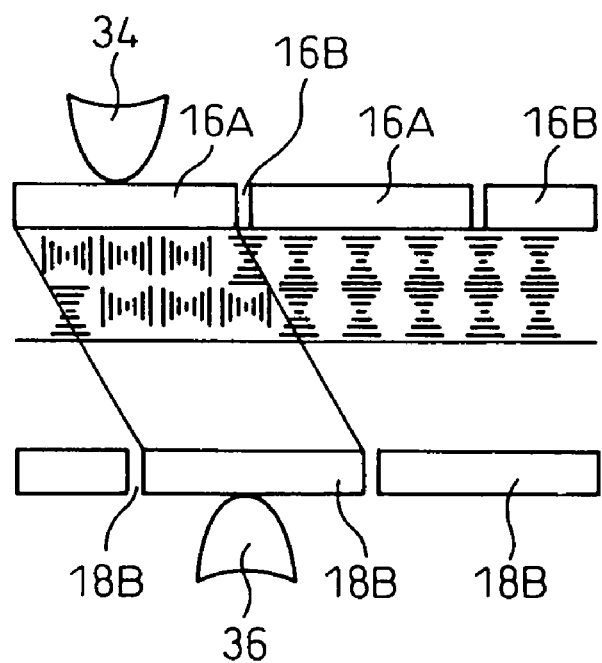
FIG. 6 is a sectional view showing electrodes included in a variant of the recording device.

FIG. 6 is a plan view showing the electrodes 16 and 18 included in a variant of the recording device 10. Referring to FIG. 6, the direction of an electric field that is regarded as a vector and induced between the pair of electrodes 16 and 18 is oblique to the surfaces of the substrates. In this case, the electrode 16 is divided into a plurality of sub-electrodes 16A, and the electrode 18 is divided in to a plurality of sub-electrodes 18A. The sub-electrodes 16A and sub-electrodes 18A are dislocated relative to each other, and the direction of the electric field induced between each of the sub-electrodes 16 and each of the sub-electrodes 18 is oblique to the surfaces of the substrates. Information can be printed on portions of the display layer adjoining the gaps 16B and gaps 18B, though it is imperfect. The gaps 16B and gaps 18B are visualized unobtrusively in an image. In the case of FIG. 5, light is randomly dispersed so that the gap 18B will be visualized unobtrusively. In the case of FIG. 6, light is dimmed so that the gaps 16B and 18B will be visualized unobtrusively.

Figure 7A:
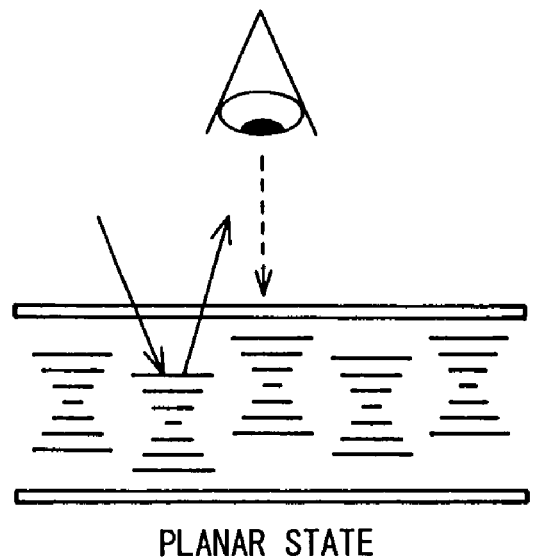
FIGS. 7A and 7B show the aligned state of cholesteric liquid crystalline molecules.
Figure 7B:
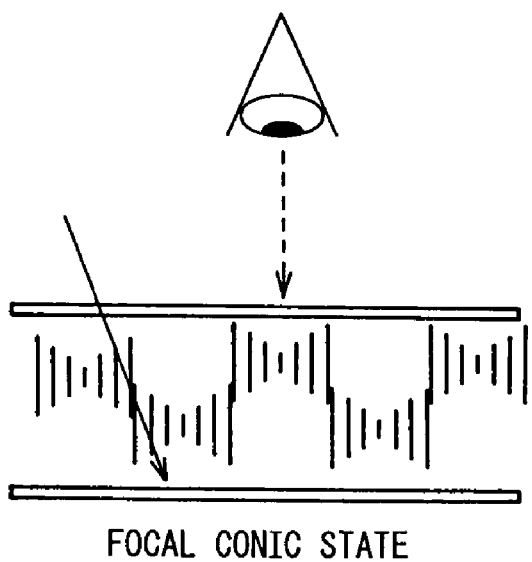

Next, the operation of the recording device 10 shown in FIG. 1 will be described with reference to FIGS. 7A to 12. The display layer 20 shown in FIG. 1 is made of a cholesteric liquid crystal. FIGS. 7A and 7B show the aligned state of cholesteric liquid crystalline molecules. The cholesteric liquid crystal enters either a planar state shown in FIG. 7A or a focal conic state shown in FIG. 7B. In either the planar state or focal conic state, the cholesteric liquid crystal remains stable even with no electric field induced. In the planar state, since incident light is reflected from the liquid crystal, human eyes can see the reflected light. In the focal conic state, incident light passes through the liquid crystal. Since the light absorption layer 28 is included separately from the liquid crystal layer, black can be displayed in the focal conic state.

In the planar state, light whose wavelength corresponds to a helical pitch of a helical structure composed of liquid crystalline molecules is reflected. The wavelength λ of maximally reflected light is provided as λ=n·p where n denotes an average refractive index of a liquid crystal and p denotes the helical pitch. Moreover, a reflective band Δλ increases proportionally to the anisotropy Δn of a refractive index of the liquid crystal.

Figure 8A:
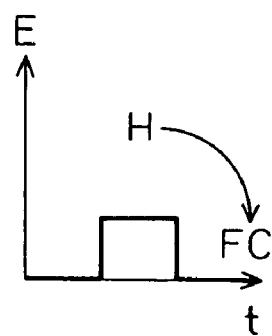
FIGS. 8A, 8B and 8C show the characteristic of a cholesteric liquid crystal relative to a voltage applied on order to drive the cholesteric liquid crystal.
Figure 8B:
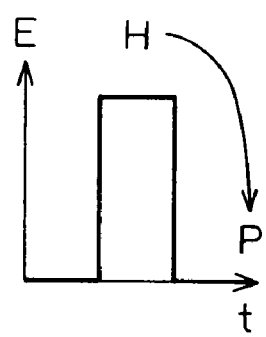
Figure 8C:
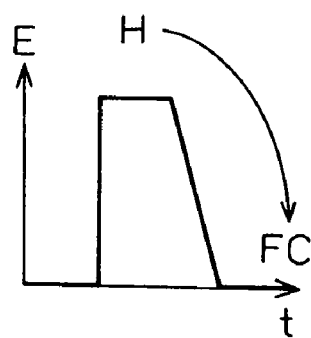

FIGS. 8A, 8B and 8C show the characteristic of a cholesteric liquid crystal relative to a voltage that is applied in order to drive the cholesteric liquid crystal (the relationship of the voltage to a time). When a strong electric field is induced in the liquid crystal, the helical structure of liquid crystalline molecules is completely collapsed, and all the molecules enter a homeotropic state, that is, are aligned with the direction of the electric field. In the drawings, H denotes the homeotropic state.

When the electric field is rapidly nullified in the homeotropic state, the helical axes of the liquid crystalline molecules become perpendicular to the electrodes. The liquid crystal enters the planar state in which light whose wavelength corresponds to the helical pitch is selectively reflected (FIG. 8B). In FIG. 8B, P denotes the planar state.

On the other hand, assume that after an electric field that is so weak as to barely loosen the helical axes of the liquid crystalline molecules is induced, the electric field is nullified (FIG. 8A), or assume that after a strong electric field is induced, the electric field is slowly nullified (FIG. 8C). In this case, the helical axes of the liquid crystalline molecules become parallel to the electrodes. The liquid crystal enters the focal conic state in which incident light passes through the liquid crystal. In FIG. 8C, FC denotes the focal conic state.

After an electric field of moderate strength is induced, if the electric field is rapidly nullified, the planar state and focal conic state coexist. This enables halftone display. As mentioned above, the cholesteric liquid crystal is bistable. This phenomenon is used to display information.

Figure 9:
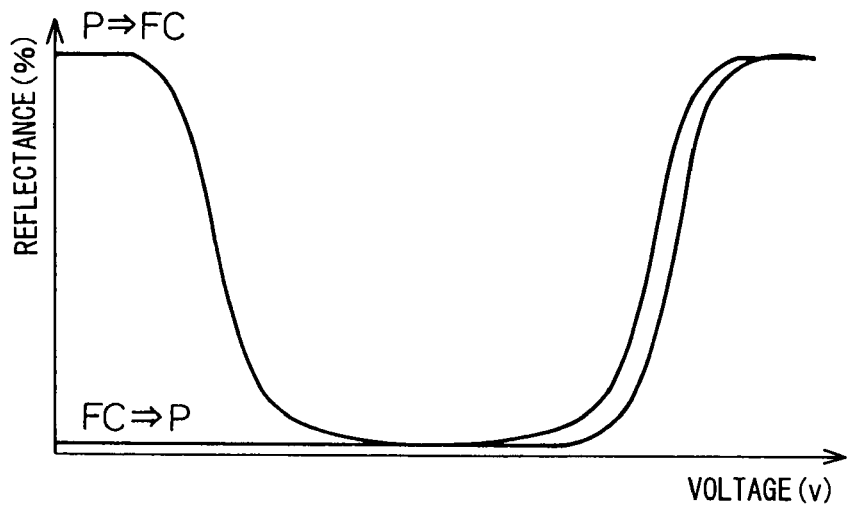
FIG. 9 shows the characteristic of the reflectance of the cholesteric liquid crystal.

FIG. 9 shows the characteristic of the reflectance of the cholesteric liquid crystal (the relationship of the reflectance to a voltage). FIG. 9 graphically shows the response time which the cholesteric liquid crystal needs to respond to a voltage and which has been described in conjunction with FIGS. 8A, 8B and 8C. When the initial state of the cholesteric liquid crystal is the planar state (indicated with the left part of FIG. 9, that is, related to a high reflectance), if a pulsating voltage is raised to a certain range, the pulsating voltage falls within a range of driving voltages which bring the cholesteric liquid crystal to the focal conic state (related to a low reflectance in FIG. 9). If the pulsating voltage is further raised, it falls within a range of driving voltages which bring the cholesteric liquid crystal to the planar state (indicated with the right part of FIG. 9 and related to high voltages).

When the initial state of the cholesteric liquid crystal is the focal conic state (indicated with the left part of FIG. 9 and related to a low reflectance), as the pulsating voltage is raised, the pulsating voltage gradually falls within a range of driving voltages which bring the cholesteric liquid crystal to the planar state.

Figure 10:
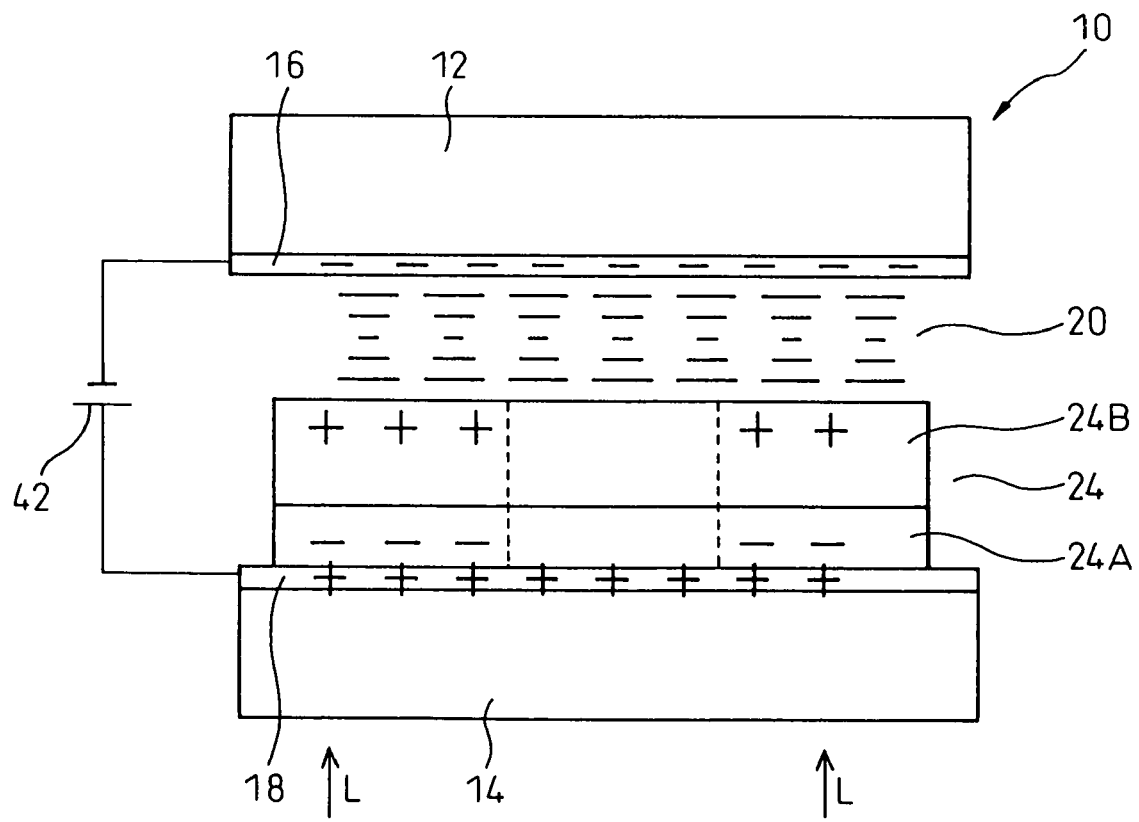
FIG. 10 is an explanatory diagram showing the operation of the recording device shown in FIG. 1.

FIG. 10 is an explanatory diagram concerning the operation of the recording device 10 shown in FIG. 1. The electrodes 16 and 18 are borne by the substrates 12 and 14 respectively, and connected to a power supply 42 via feed members (contacts). The substrates 12 and 14 may be made of a glass. Preferably, the substrates 12 and 14 are made of a flexible material such as a film so that the recording device can be folded like paper and then carried with a user or can be curved for recording.

The photoconductive layer 24 may be made of an inorganic material such as an amorphous silicon or an organic material. A flexible and organic photoconductor would be more suitable for the recording device 10 in accordance with the present invention. The organic photoconductor is abbreviated to OPC and is widely used for printers or the like. Referring to FIG. 10, the photoconductive layer 24 is realized with the OPC, or more particularly, a functionally separated organic OPC composed of two functional films, that is, a charge generation layer 24A and a charge transport layer 24B. The functionally separated OPC has many merits including the merit of excellent reformability.

However, the photoconductive layer 24 is not limited to the functionally separated OPC but may be made of a monolayer OPC that has only one layer and generates and transports charge. The monolayer OPC has been employed for more years than the functional separated OPC has, and is said to exhibit poor reformability. However, as far as the adaptation of the monolayer OPC to the recording device 10 is concerned, since the monolayer OPC will not be abraded as greatly as the one adapted to a printer, the monolayer OPC can employed without concern.

Assume that light L is selectively irradiated to the photoconductive layer 24 with a voltage applied to the electrodes 16 and 18. In this case, a high voltage is applied to a portion of the liquid crystal adjoining the portion of the photoconductive layer to which the light L is irradiated, and a low voltage is applied to the portion of the liquid crystal adjoining to the portion (center portion in FIG. 10) of the photoconductive layer 24 to which the light L is not irradiated. Thus, the state of the liquid crystal can be controlled through selective irradiation of light.

Figure 11:
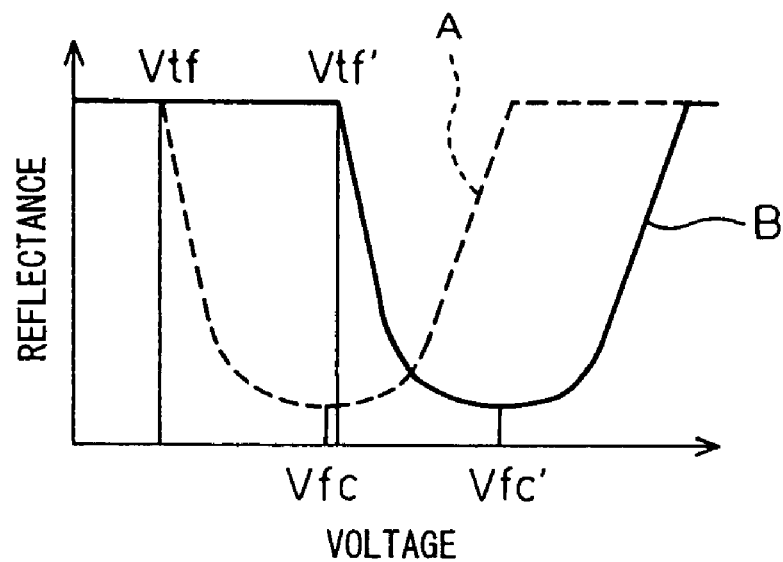
FIG. 11 shows the display characteristic (reflectance) of a recording device composed of a cholesteric liquid crystal layer and a photoconductive layer.
Figure 12:
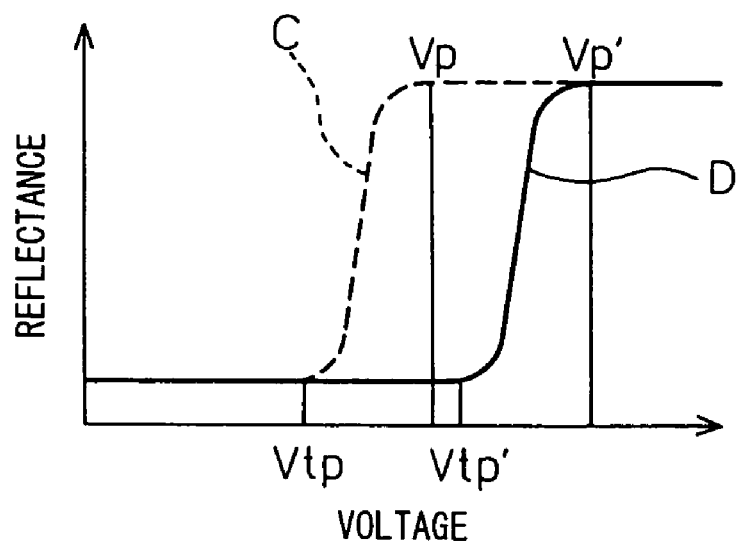
FIG. 12 shows the display characteristic (reflectance) of a recording device composed of a cholesteric liquid crystal layer and a photoconductive layer.

FIGS. 11 and 12 show the display characteristic (reflectance) of the recording device 10 having the combination of the cholesteric liquid crystal layer and photoconductive layer. FIGS. 11 and 12 are analogous to FIG. 9.

FIG. 11 shows the display characteristic, which is exhibited during a transition from the planar state to the focal conic state when light is irradiated, in comparison with the one exhibited when no light is irradiated. A curve A indicates the display characteristic exhibited when light is irradiated, while a curve B indicates the display characteristic exhibited when no light is irradiated. When light is irradiated, once a pulsating voltage exceeds a certain threshold Vtf, the liquid crystal layer makes a transition to the focal conic state. Assuming that a voltage with which the liquid crystal fully enters the focal conic state is a voltage Vfc, if the voltage becomes equal to or higher than the voltage Vfc, the liquid crystal layer reenters the planar state.

When no light is irradiated, a threshold Vtf' causing the liquid crystal layer to make a transition to the focal conic state and a voltage Vfc' causing the liquid crystal layer to fully enter the focal conic state are higher than those required when light is irradiated.

Assume that a voltage required when light is irradiated is compared with a voltage required when no light is irradiated. The voltage Vfc causing the liquid crystal to enter the focal conic state when light is irradiated is lower than the threshold Vtf' causing the liquid crystal to make a transition to the focal conic state when no light is irradiated. Namely, the application of the voltage Vfc causes the portion of the liquid crystal, to which light is irradiated, to make a transition to the focal conic state, but causes the portion thereof, to which no light is irradiated, to remain in the planar state.

FIG. 12 shows the display characteristic, which is exhibited during a transition from the focal conic state to the planar state when light is irradiated, in comparison with the one exhibited when no light is irradiated. A curve C indicates the display characteristic exhibited with light irradiated, while a curve D indicates the display characteristic exhibited with no light irradiated. When light is irradiated, if an applied voltage exceeds a voltage Vtp, the liquid crystal makes a transition to the planar state. If the applied voltage becomes a voltage Vp, the liquid crystal fully enters the planar state.

When no light is irradiated, if the applied voltage exceeds a voltage Vtp', the liquid crystal makes a transition to the planar state. If the applied voltage becomes a voltage Vp', the liquid crystal fully enters the planar state. Even in FIG. 12, similarly to FIG. 11, a driving voltage greatly varies depending on whether light is irradiated. The portion of the liquid crystal to which light is irradiated makes a transition to the planar state, but the portion thereof to which no light is irradiated enters the focal conic state. Thus, although the same voltage is applied, the alignment of liquid crystalline molecules is different between the portion of the liquid crystal to which light is irradiated and the portion thereof to which no light is irradiated. This phenomenon is utilized in order to record characters or an image.

Figure 13:
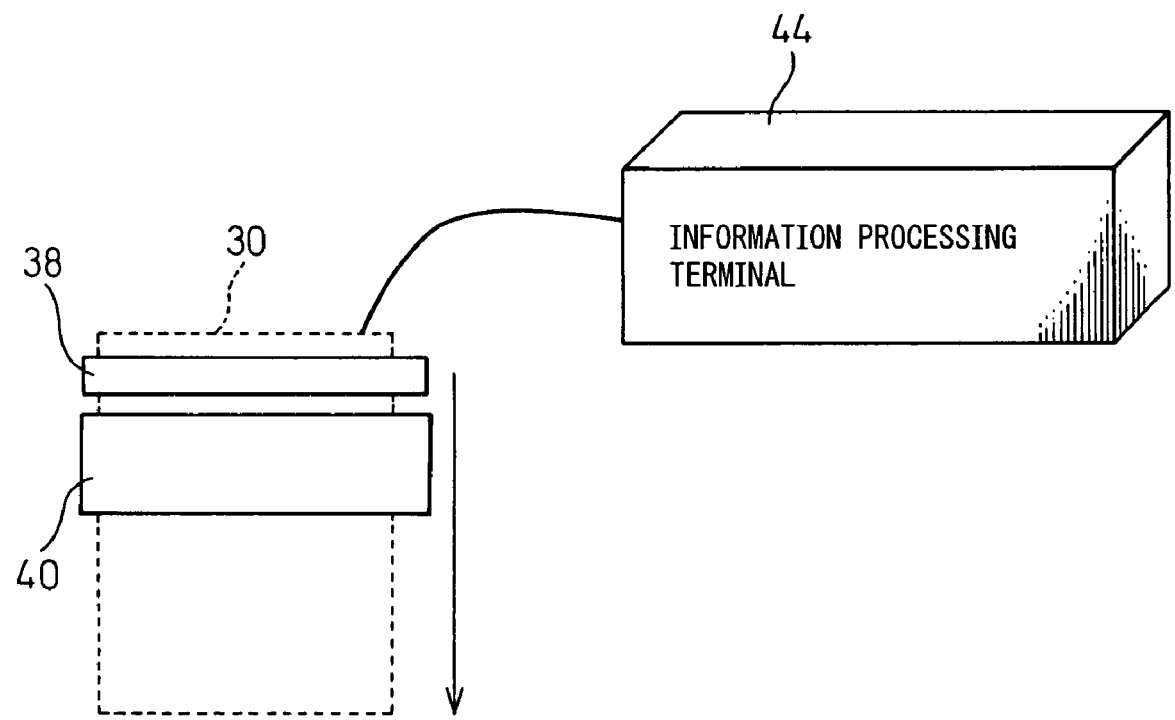
FIG. 13 shows a case where the recorder shown in FIG. 2 is connected to an information processing terminal.

FIG. 13 shows the connection of the recorder 30 shown in FIG. 2 to an information processing terminal 44. The recorder 30 receives information from a personal computer or any other information processing terminal 44, and writes the information in the recording device 10. The recorder 30 is controlled by the personal computer or any other information processing terminal 44.

A first light source 38 for recording is swept while sequentially irradiating light to the recording device 10 in a lateral direction of the recording device 10 using an LED array or a semiconductor laser. Furthermore, the first light source 38 is moved in a longitudinal direction of the recording device 10 as indicated with an arrow in order to scan the recording device 10. Otherwise, the recording device 10 may be moved with the first light source 38 held stationary. Using the LED array, the first light source 38 is realized inexpensively and simply.

A second light source 40 is a light source for reset. The second light source 40 is realized using an LED, an organic electroluminescent lamp, or a fluorescent lamp that enables uniform exposure. Moreover, any of these members may be used in combination with a light guide plate. When information recorded in the recording device 10 is deleted or the recording device 10 is so-called reset, the second light source 40 is lit over a wide range in order to irradiate light to the photoconductive layer 24. When light is uniformly irradiated from the second light source 40, a pulsating signal is applied to the electrodes 16 and 18 of the recording device 10 via the feed members 34 and 37. Consequently, the liquid crystal is entirely initialized into the planar state.

The reason why light is irradiated to the photoconductive layer 24 for reset is that when light is irradiated to the photoconductive layer 24, the resistance given by the photoconductive layer 24 decreases and an apparent voltage to be applied to the liquid crystal falls. When light is irradiated to the photoconductive layer 24, the liquid crystal can be initialized into the planar state with application of a lower voltage. Even if the second light source 40 is not included, as long as a high voltage is applied, the liquid crystal can be driven to the planar state. However, especially when the recording device is large in size, after a voltage is applied, a large current flows instantaneously. This is critical in terms of safety. Therefore, when the liquid crystal is reset by applying a relatively low voltage thereto with light irradiated, it is more advantageous in terms of safety. However, irradiation of light to the photoconductive layer 24 for a long period of time may invite fatigue and deterioration of the photoconductive layer 24. Therefore, the irradiation of light from the planar light source should be performed basically solely for the purpose of reset and completed for as short a period as possible.

On the other hand, the first light source 38 (LED array) to be used for recording is generally characterized by a small focal depth and tends to become out of focus. Therefore, preferably, the focal length of the first light source is made adjustable. The focus of the first light source may be adjusted manually or automatically.

For recording, the first light source (LED array) 38 or the recording device 10 itself is swept in a sub-scanning direction. Depending on whether the LED array or recording device is moved, the recorder is designed to be of either of two types described below.

Figure 14:
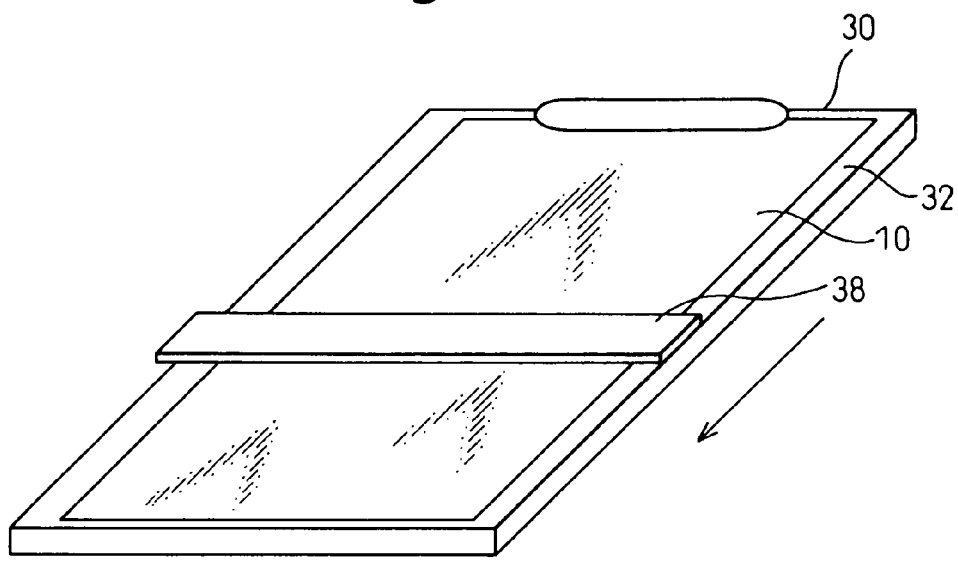
FIG. 14 is a perspective view showing an example of a flatbed recorder.

FIG. 14 is a perspective view showing an example of a flatbed recorder. The recorder 30 has the features that information recorded in the recording device 10 can be discerned in real time and the recorder is thin. The thin casing 32 that looks like a tablet has a support base on which the recording device 10 is placed. The first light source 38 realized with an LED array is swept for recording.

Figure 15:
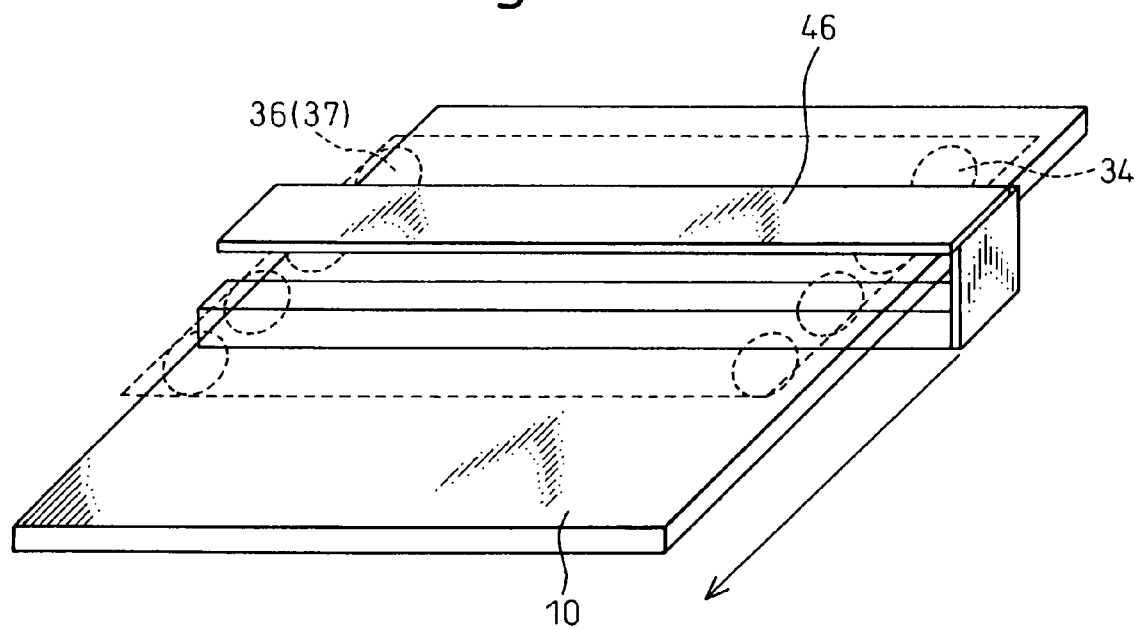
FIG. 15 shows a first light source and an interceptive member included in the flatbed recorder shown in FIG. 14.

FIG. 15 shows the first light source 38 and an interceptive member 46 included in the flatbed recorder 30 shown in FIG. 14. The first light source 38 is located below the recording device 10, and light is irradiated to the photoconductive layer 24 located on the back of the recording device 10. The interceptive member 46 is located above the recording device 10 in order to prevent extraneous light from falling on the top of the recording device 10. The interceptive member 46 has a width equal to or slightly larger than the width of each of the stripe-like sub-electrodes 18A into which the electrode 18 is divided. The interceptive member 46 is coupled to the first light source 38 and moved together with the first light source 38.

The feed member 34 is disposed in contact with the electrode 16 of the recording device 10, and the feed member 36 is disposed in contact with the electrode 18 of the recording device 10. Moreover, the feed member 37 is disposed to come into contact with the electrode 18 of the recording device 10 during reset. A voltage is applied to the electrodes 16 and 18. The feed member 34 is normally set to a ground voltage (GND) and used for both recording and reset. The feed member 36 is shifted synchronously with the first light source 38, and a voltage is applied via the feed member 36 for recording. The feed members 34, 36, and 37 are preferably shaped spherically or shaped like flexible projections because of a small load to be imposed on the recording device 10.

As mentioned above, what counts with the recording device 10 of the present invention is the structure of at least one of the electrodes 16 and 18. If the electrodes 16 and 18 were simple mat electrodes, an applied voltage would act on the entire recording device 10. This would raise a possibility that the display state of the recording device, that is, the states of an unrecorded portion and a recorded portion of the recording device may be changed due to noise light such as extraneous light. Namely, if extraneous light falls on a portion of the recording device 10 other than a portion thereof being scanned by the first light source 38, the state of the liquid crystal may be changed by the extraneous light.

In order to completely intercept extraneous light, the recorder must include an interceptive structure. This degrades the compactness and usefulness of the recorder. Therefore, at least one of the electrodes, that is, the electrode 18 is divided into a plurality of sub-electrodes 18A. A voltage is applied to each of the sub-electrodes 18A via the feed members 34 and 36. The first light source 38 irradiates light to the portion of the recording device corresponding to the sub-electrode 18A to which the voltage is applied. Since no voltage is applied to the remaining sub-electrodes 18A, even if extraneous light falls on the sub-electrodes 18A, the state of the liquid crystal will not be changed by the extraneous light. Furthermore, the movement of the interceptive member 46 is interlocked with the movement of the first light source 38. This prevents extraneous light from falling on any of the sub-electrodes 18A being written.

Either of the electrodes 16 and 18 of the recording device 10 is divided into sub-electrodes within an appropriate range, whereby the adverse effect of extraneous light (noise light) on the unrecorded portion or recorded portion can be avoided. A display state can be retained reliably. Consequently, even in a bright place like a place in a room under a fluorescent lamp, the compact recorder 30 is used to record information in the recording device 10 without concern.

The size of the sub-electrodes into which the electrode 18 is divided has been discussed. Consequently, if the width of one of the sides of each of the stripe-shaped sub-electrodes 18A is equal to or larger than 1 cm or the gap 18B (non-electrode portion) between adjoining sub-electrodes 18A is equal to or smaller than 50 µm, the gaps 18B are unobtrusive and do not hinder discernible display.

Figure 16:
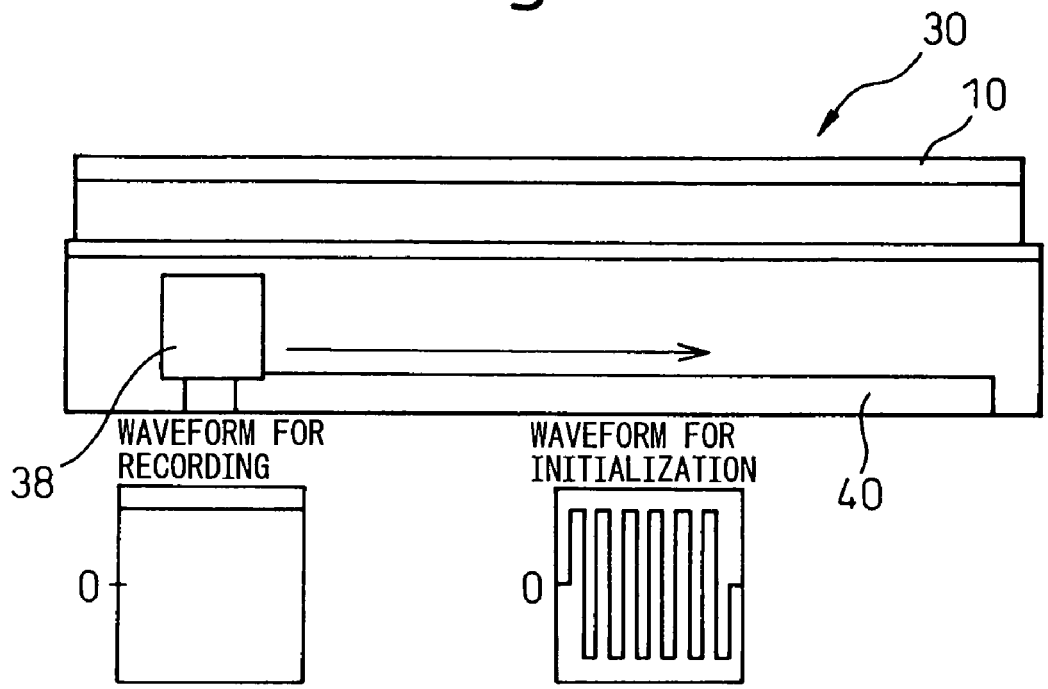
FIG. 16 is a sectional view showing the positions of first and second light sources in the flatbed recorder.

FIG. 16 is a sectional view showing the positions of the first and second light sources 30 and 40 in the flatbed recorder shown in FIG. 14. The first light source 38 for recording is movable in a direction of an arrow. For recording, a voltage is applied via the feed members 34 and 36. The first light source 38 scans the recording device 10 while flickering light in a main scanning direction (a lateral direction of the recording device 10) and moving in a sub-scanning direction (a longitudinal direction of the recording device 10). The second light source 40 for initialization or reset is held stationary on the bottom of the recorder 30 and irradiates light to the entire surface of the recording device 10 at a time. In this case, a pulsating ac voltage is applied to the electrodes 16 and 18 via the feed members 34 and 37. After reset is completed, recording is initiated.

Figure 17:
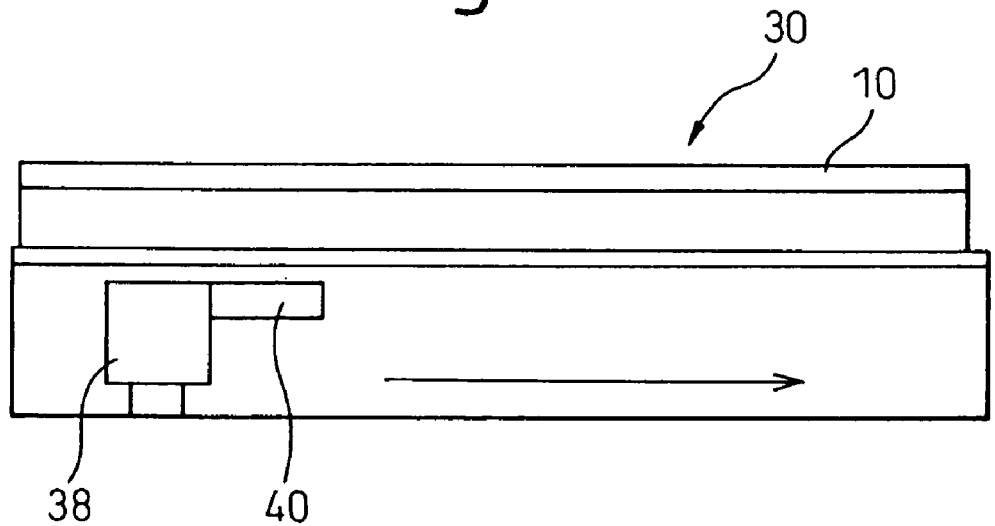
FIG. 17 is a sectional view showing the positions of first and second light sources in a variant of the flatbed recorder.

FIG. 17 is a sectional view showing the positions of the first and second light sources 38 and 40 in a variant of the flatbed recorder shown in FIG. 14. The second light source 40 for initialization or reset is attached to the front side of the first light source 38 so that it will be moved together with the first light source 38. In this case, while the first and second light sources 38 and 40 are moved, recording can be achieved immediately after completion of reset. The variant shown in FIG. 17 has the merit that reset and recording can be achieved during one cycle. Consequently, deletion of recorded information and writing of new information can be achieved for a short period of time.

Figure 18:
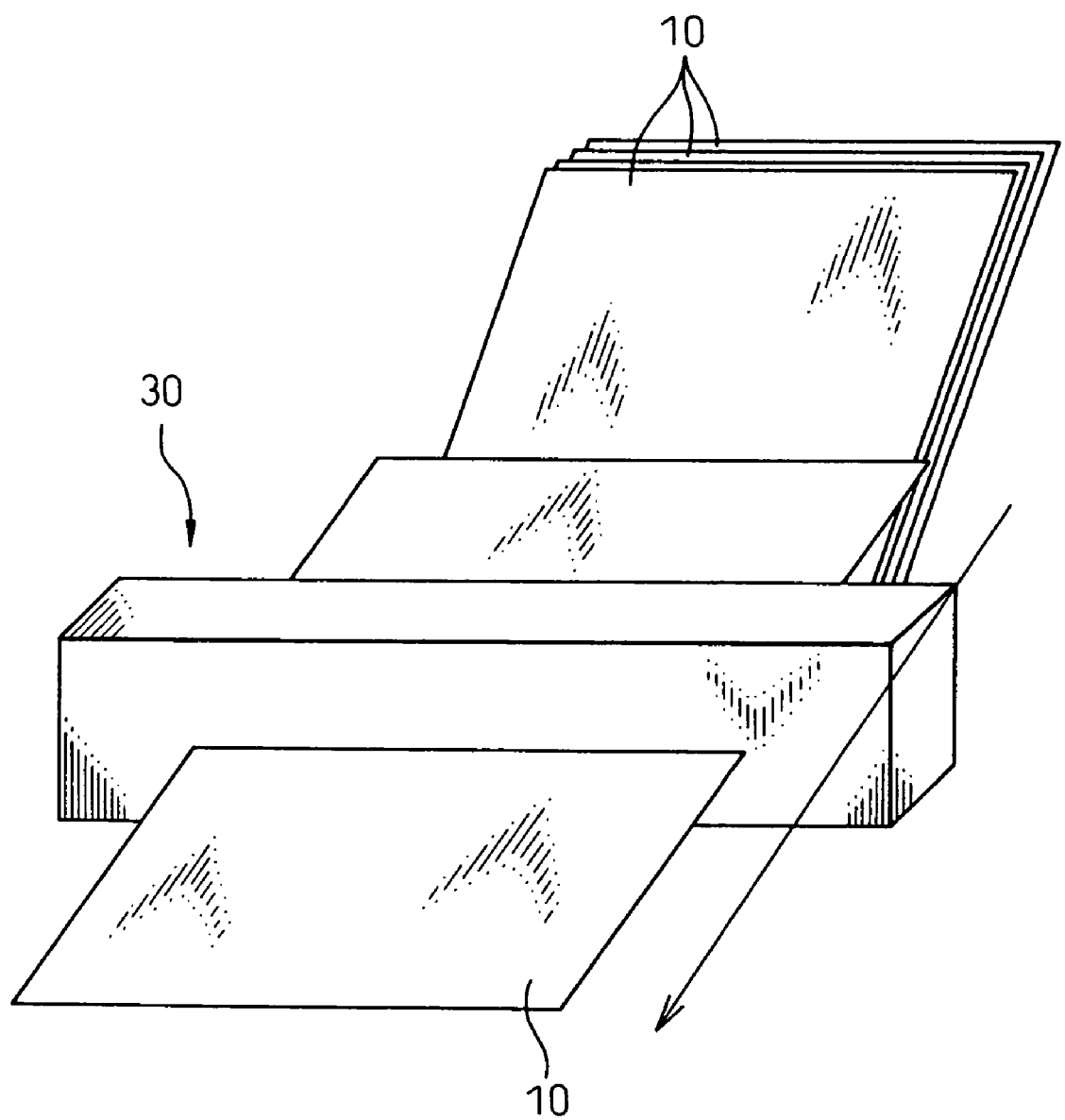
FIG. 18 is a perspective view showing a sheet-fed recorder.

FIG. 18 is a perspective view showing a sheet-fed recorder. The sheet-fed recorder 30 can accommodate a plurality of recording devices 10 in a stacker.

Figure 19:
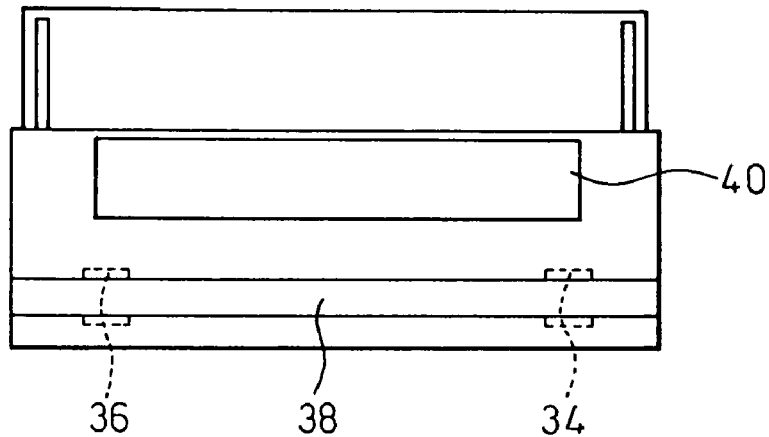
FIG. 19 is a sectional view showing the sheet-fed recorder.
Figure 20:
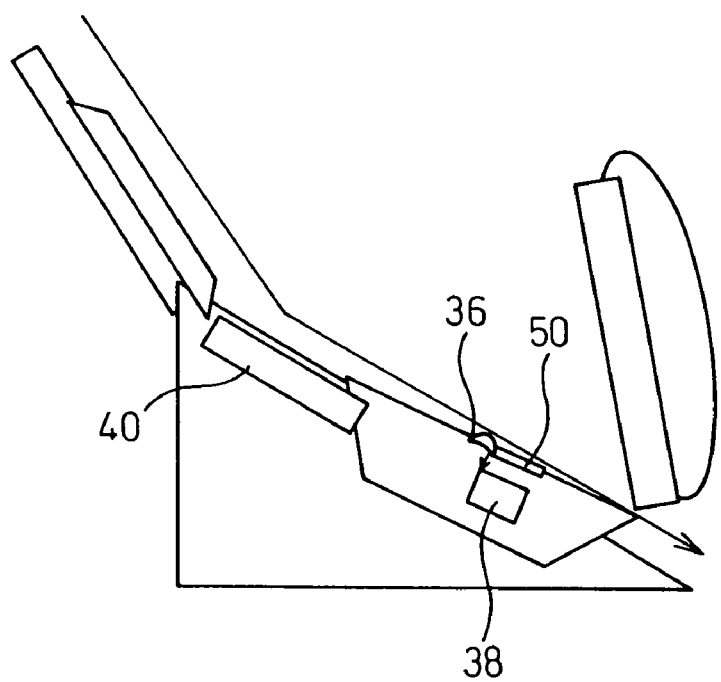
FIG. 20 is a side sectional view showing the sheet-fed recorder shown in FIG. 19.

FIG. 19 is a sectional view showing the sheet-fed recorder shown in FIG. 18. FIG. 20 is a side sectional view of the sheet-fed recorder shown in FIG. 19. The first light source 38 and second light source 40 are held stationary in the sheet-fed recorder 30. In addition, a device transportation mechanism is included in the recorder. The recording device 10 is transported along a transportation path along which the first light source 38 and second light source 40 are located. During the transportation, recording is achieved. In this case, the second light source 40 for reset is located at an upstream side of the transportation path relative to the first light source 38 for recording (for example, located near a component in which the recording devices 10 are stacked). Similarly to the variant shown in FIG. 17, (a) deletion of previously recorded information and (b) recording of new information can be executed during one cycle of scanning.

Figure 21A:
FIGS. 21A and 21B show a feed member included in the recorder shown in FIG. 20.
Figure 21B:
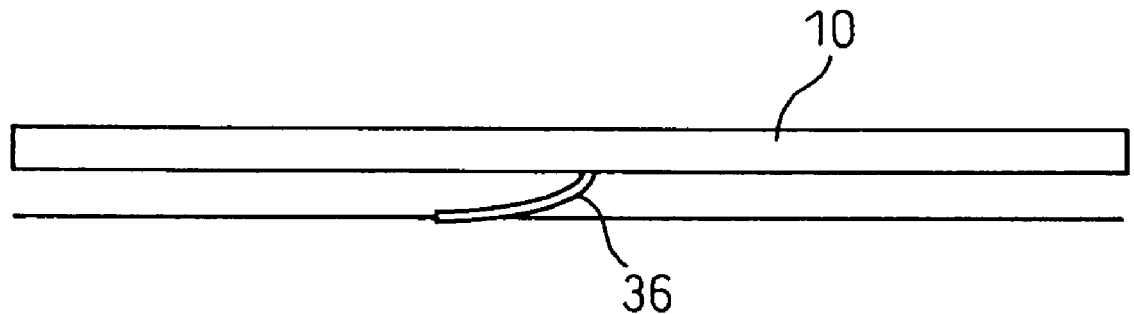

FIGS. 21A and 21B show one of the feed members, that is, the feed member 36 shown in FIG. 20. The feed member 36 is realized with a cushion-like projection located at an appropriate position along the device transportation path in the recorder 30. When the recording device 10 is transported, the feed member 36 touches the associated electrode and is flexibly bent so that a voltage will be applied to the electrode via the feed member. The feed member 36 may be spherical. In FIG. 20, the first light source 38 is protected by a protective glass 50.

Figure 22:
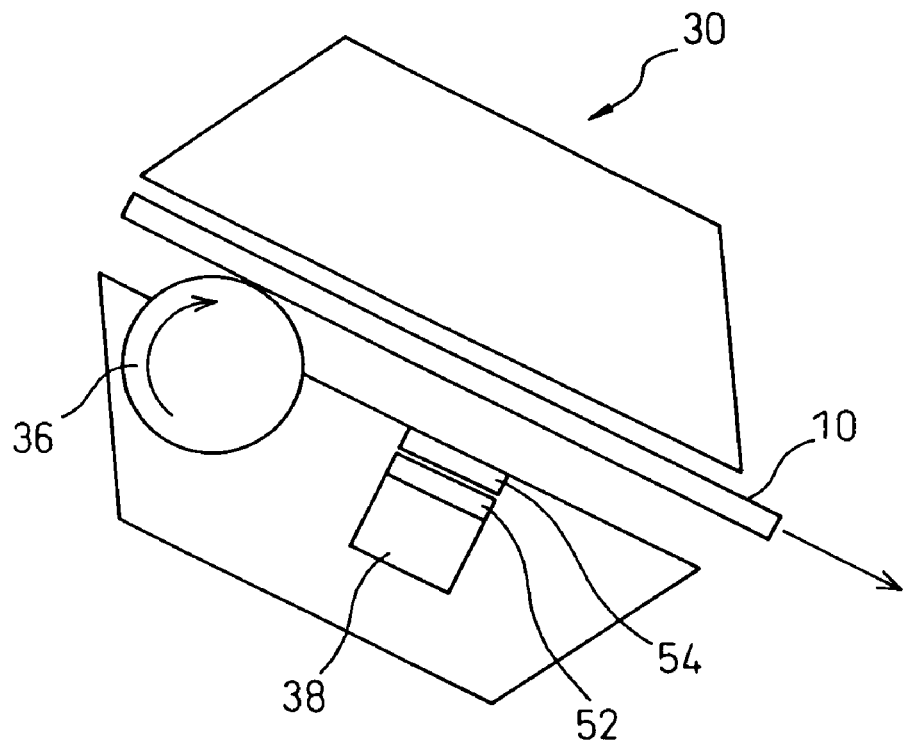
FIG. 22 is a sectional view showing a variant of the sheet-fed recorder.
Figure 23:
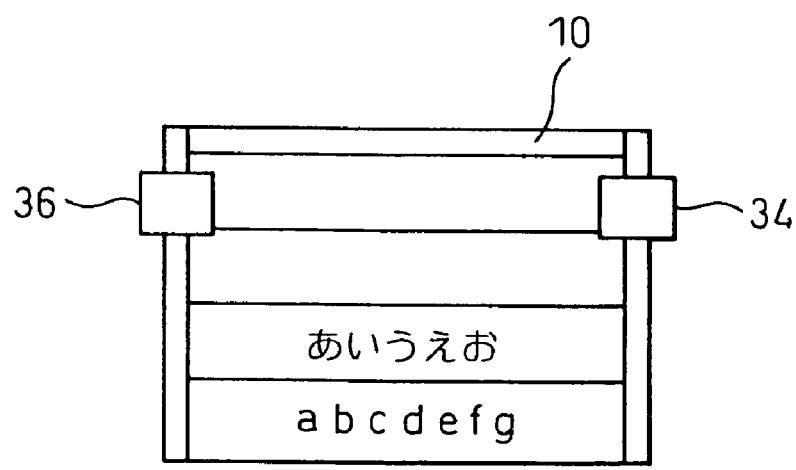
FIG. 23 shows the relationship between feed members included in the recorder shown in FIG. 22 and the recording device.

FIG. 22 is a sectional view showing a variant of the sheet-fed recorder. FIG. 23 shows feed members included in the recorder shown in FIG. 22 and a recording device. In this variant, the feed members 34 and 36 are realized with rollers. Furthermore, the rollers serve as transportation rollers for transporting the recording device 10 within the recorder 30. FIGS. 21A to 23 show only the feed members 34 and 36 located below a device transportation path. The feed member 37 located above the device transportation path may be structured in the same manner as the feed members 34 and 36.

When the feed members 34 and 36 are realized with rollers, the rollers are preferably located at the lateral ends of the recording device 10. In the case of a printer, transportation rollers are disposed to come into contact with the center of a sheet of paper. If the rollers coming in contact with the recording device 10 touch the center of the recording device 10, a load is imposed on the liquid crystal realizing the display layer 20. This disturbs the alignment of liquid crystalline molecules and may eventually degrade the quality of display. Moreover, if the rollers were located in the center of the recording device 10, fog may be derived from extraneous light. Therefore, the rollers are preferably located at the ends of the recording device 10.

Figure 24:
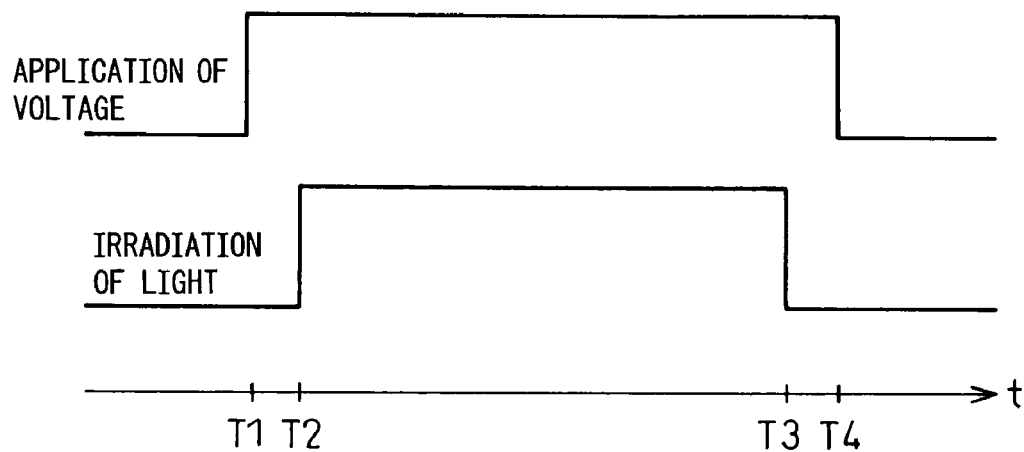
FIG. 24 is an explanatory diagram concerning the actions to be performed in the recorder.

FIG. 24 is an explanatory diagram concerning actions to be performed in the recorder. For writing of information, a voltage is applied synchronously with the timing of irradiating light from the first light source 38. For the writing of information, for example, a voltage is applied to the electrodes 16 and 18 at a time instant T1. At a time instant T2, irradiation of light from the first light source 38 is initiated. At a time instant T3, the irradiation of light from the first light source 38 is completed. At a time instant T4, application of the voltage is ceased. The waveform of the voltage is determined with the material of the recording device 10 or the characteristic thereof.

In the recorder 30 employing the first light source 38 that is realized with an LED array, writing can be performed to offer any resolution. In particular, the recording device 10 employing a cholesteric liquid crystal is characterized by a much higher resolution than a printout of paper is. A high-resolution recording method to be described below would prove effective for the recording device. As far as a flatbed scanner is concerned, when processing must be completed quickly, writing may be speeded up at the sacrifice of a resolution. When an output exhibiting a high resolution is needed, writing is performed slowly.

Figure 25A:
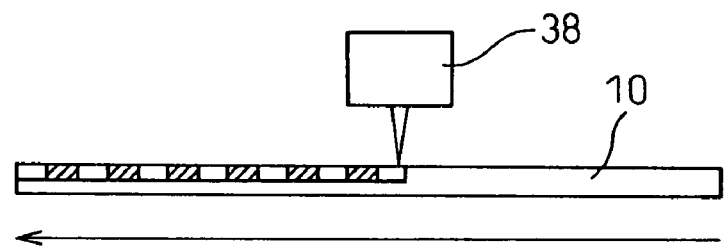
FIGS. 25A and 25B show cases where a resolution is improved.
Figure 25B:
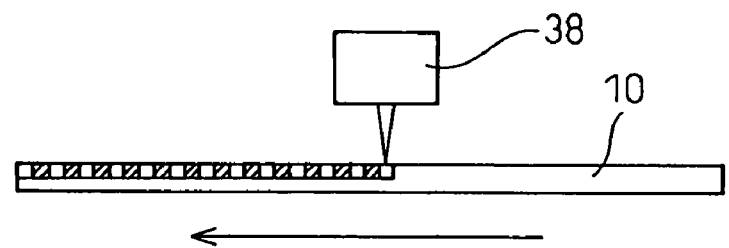

FIGS. 25A and 25B are concerned with a case where a resolution is improved. In this case, a resolution in a sub-scanning direction is doubled. An arrow indicates a direction in which the recording device 10 is transported. Based on the same principles as those of scanners, assuming that a writing speed permitting a resolution of 600 dpi is 1 (FIG. 25A), if writing is performed in order to attain a resolution of 1200 dpi (FIG. 25B), a writing speed is set to 0.5. Thus, an amount of optical information per pixel is doubled to permit a high resolution.

Figure 26A:
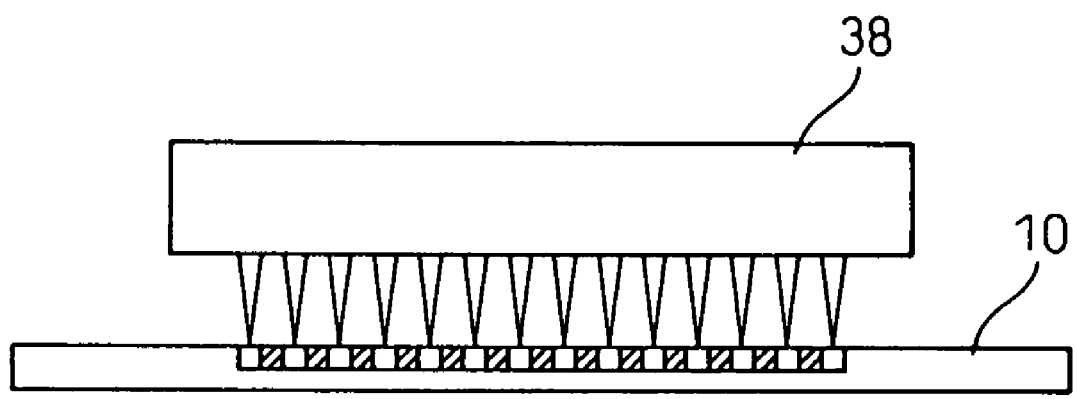
FIGS. 26A and 26B show cases where a resolution is improved.
Figure 26B:
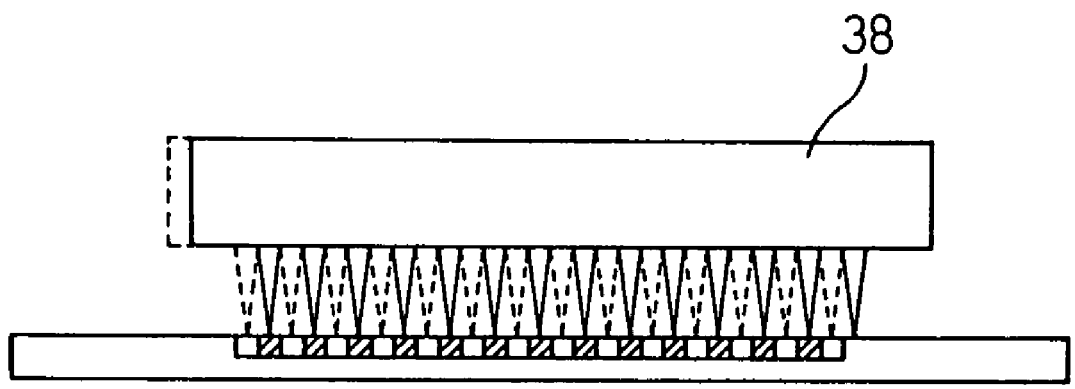

FIGS. 26A and 26B are concerned with another case where a resolution is improved. In this case, a resolution in a main scanning direction is doubled. For example, when writing is performed in order to attain a resolution of 600 dpi, a space between dots is approximately 40 µm. On the other hand, when writing is performed in order to attain a resolution of 1200 dpi, the space between dots is approximately 20 µm. When LEDs are juxtaposed at intervals of 40 µm, an image exhibiting 600 dpi is written inevitably. After one image is written (FIG. 26A), if the first light source 38 realized with an LED array is shifted by 20 µm in a lateral direction (FIG. 26B), writing can be achieved to permit a resolution equivalent to 1200 dpi.

As mentioned above, when the first light source 38 can be moved in a horizontal direction and a vertical direction, writing can be achieved to permit any resolution. Moreover, a writing area may be designated in the same manner as it is in a scanner. A drawing-like (line-by-line) writing method may be adopted on behalf of a comprehensive writing method. A user can enjoy freedom in writing, or, freedom in determining a resolution or a writing speed. Information that must not be deleted can be preserved, and new information can be recorded additionally.

Figure 27:
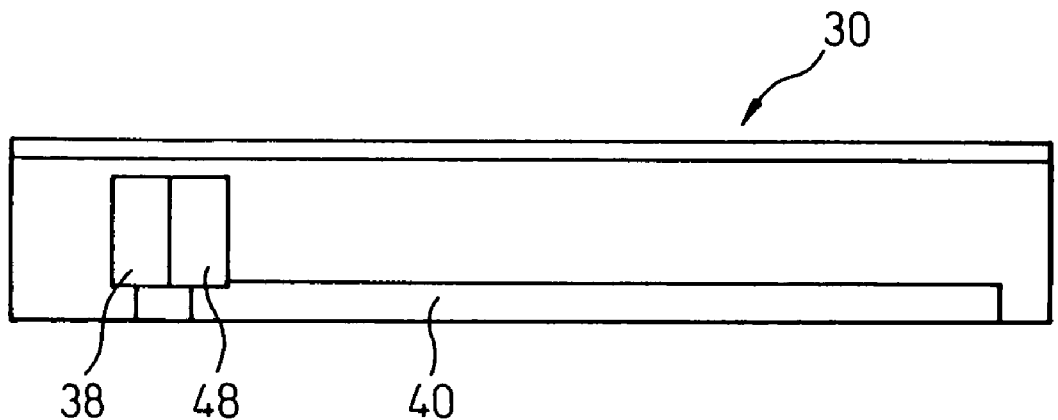
FIG. 27 shows a variant of the recorder.
Figure 28:
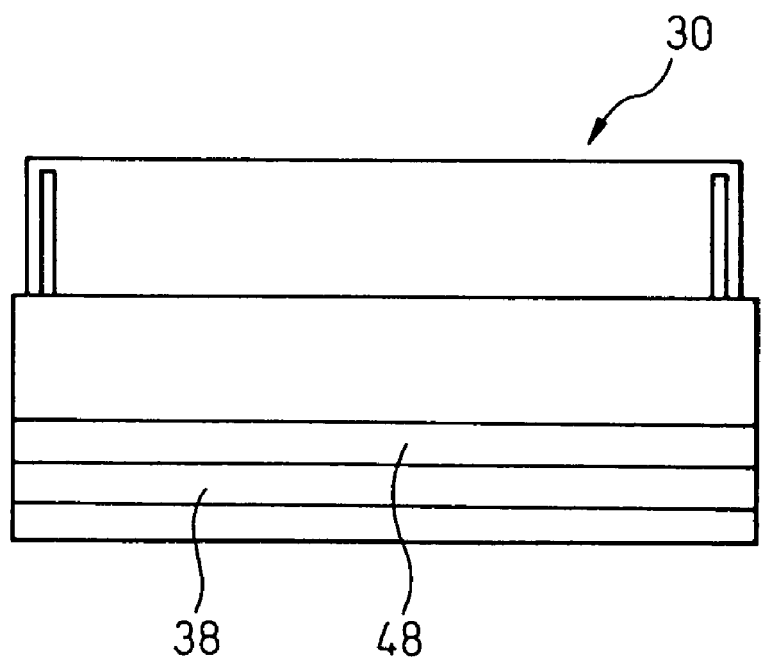
FIG. 28 shows a variant of the recorder.

FIGS. 27 and 28 show variants of recorders. FIG. 27 shows a variant of the flatbed recorder 30, and FIG. 28 shows a variant of the sheet-fed recorder 30. In the variants, the recorder 30 has a driver 48 disposed adjacently to the first light source 38. The driver 48 is employed in scanners, includes a photoelectric element, and helps enter information. In this case, the recorder 30 serves as a multifunctional recorder having the capability of a scanner and the capability of a recorder. Namely, one recorder can achieve both reception and transmission of image information.

Next, the recording device 10 and the flatbed recorder 30 will be described in more detail. The display layer 20 included in the recording device 10 is realized with a chiral nematic liquid crystal having an appropriate amount of a chiral material (Model CB15 manufactured by Merck & Co., Inc.), which induces a rightward twist, contained in a liquid crystal (Model E48 manufactured by Merck & Co., Inc.). The thickness of the liquid crystal layer is 5 µm. The electrodes 16 and 18 included in the recording device 10 are realized with indium-tin-oxide (ITO) films that are uniformly deposited all over the surfaces of the film substrates 12 and 14 respectively. At least one of the electrodes is divided into stripe-like blocks by performing etching, whereby sub-electrodes are formed. The width of sub-electrodes is 1 cm, and the space between adjoining sub-electrodes is 50 µm. The ends of the sub-electrodes are randomly deformed. The photoconductive layer 24 is realized with a monolayer organic photoconductor (OPC) of 6 µm thick.

In the recorder 30, the first light source 38 is realized with an LED array having LEDs juxtaposed along a straight line. The space between adjoining LEDs is approximately 40 µm. The recorder 30 offers a resolution of 600 dpi or the like. If recording is performed at a speed equivalent to a standard printing speed of 8 pages per minute (ppm), a moving speed at which the LEDs are moved is approximately 5.5 cm/s. This speed is adopted as a standard speed but the moving speed is not limited to the standard speed.

The display device or recording device 10 is placed on the support base of the flatbed recorder 30. After a user mounts the recording device 10, the user executes an initialization command at a personal computer or any other terminal. The second light source 40 for initialization located on the bottom of the recorder 30 emits light. A voltage of 150 V is applied to the electrodes 16 and 18 of the recording device 10 via the feed members 34 and 37. Recorded characters or a recorded image is deleted as if those written on paper were erased with an eraser.

Thereafter, a recording job is initiated in order to record a document or an image. When the recorder 30 receives a recording instruction from the terminal, a control unit converts the form of the document or image into another form so as to make preparations for recording. When preparations for recording are made, a voltage of approximately 100 V is applied via the feed members 34 and 36. The LEDs realizing the first light source 38 irradiate light to the bottom of the recording device 10, that is, to the photoconductive layer 24, and scan the recording device 10 while flickering the light so as to print an image or characters.

At this time, the feed members 34 and 36 (or one of the feed members, that is, the feed member 36 alone) make parallel movement together with the first light source 38. Information is recorded only in a portion of the recording device to which light is irradiated. The other portion of the recording device to which no light is irradiated is exposed to extraneous light. However, since the electrode 18 of the recording device 10 is divided into the sub-electrodes 18A, no voltage is applied to the other portion of the recording device. The display state of the recording device will not be changed.

The user can observe in real time the moment information is recorded in the recording device 10 using the first light source 38. When the recording is completed, an applied voltage is nullified. The user then takes the recording device 10 out of the recorder 30. Thus, the recording device 10 (reflective display device) offers a high resolution, provides highly discernible display, relieves a user from eyes' fatigue, and imposes no load on an environment.

Furthermore, as described with reference to FIG. 27, when the recorder 30 has the capability of a scanner, if a user executes a scanner command at a personal computer or any other terminal, a CCD head included in the recorder 30 is activated in order to scan a display medium in the same manner as a typical flatbed scanner.

Next, the sheet-fed recorder 30 will be described in more detail. The recording device 10 shall be identical to the foregoing one. The recording device 10 is put in a stacker included in the sheet-fed recorder 30. After a user mounts the recording device 10, the user executes an initialization command at a personal computer or any other terminal. Transportation of the recording device 10 is then initiated. When the recording device 10 reaches the second light source 40 for initialization located on the bottom of the recorder 30, the second light source 40 emits light. A voltage of 150 V is applied to the electrodes 16 and 18 of the recording device 10 via the feed members 34 and 37, whereby recorded characters or a recorded image is deleted.

Thereafter, when the recording device 10 reaches the first light source 38 for recording, a document or an image is recorded with flickering light emitted from the LEDs.

At this time, a portion of the recording device to which no light is irradiated is exposed to extraneous light. However, since the electrode 18 of the recording device 10 is divided into the plurality of sub-electrodes 18A, no voltage is applied to the portion. The display state of the recording device will not be changed.

When recording is completed, the recording device is transported to an ejector included in the recorder. Thus, the recording device 10 (reflective display device) offers a high resolution, provides highly discernible display, relieves a user from eyes' fatigue, and imposes no load on an environment.

Furthermore, as described with reference to FIG. 28, when the recorder 30 has the capability of a scanner, if a user executes a scanner command at a personal computer or any other terminal, a CCD head included in the recorder 30 is activated. Consequently, the recorder scans a display medium in the same manner as a typical flatbed scanner.

Moreover, according to the present invention, the display layer 20 included in the recorder 10 is not limited to the cholesteric liquid crystal. Alternatively, an optical recording medium based on, for example, an electrophoretic technique or a twist ball technique may be adopted as the display layer 20.

According to the present invention, there is provided a reflective recording device that can greatly reduce a load on an environment caused by conventional waste of paper and provide highly discernible display. Moreover, a recording device and a recorder that offer a high resolution, cost low, and save energy can be realized. The recording device and recorder obviate the necessity of the process of development or fusion which conventional printers require. Therefore, the recorder can be shaped simply and designed compactly and inexpensively. The recording device is of an optically writable type, is reusable many times, and is inexpensive and highly reliable.

What is claimed is:

1. A recording device comprising a display, a photoconductor superposed on the display, a pair of electrodes disposed on the display and photoconductor respectively, wherein at least one of the pair of electrodes is divided into a plurality of sub-electrodes, the sub-electrodes are shaped like stripes, and the opposite ends of the sub-electrodes are curved.

2. The recording device as claimed in claim 1, wherein the width of each of the sub-electrodes is equal to or larger than 1 cm.

3. The recording device as claimed in claim 1, wherein the space between adjoining sub-electrodes is equal to or smaller than 50 µm.

4. The recording device as claimed in claim 1, wherein the display is realized with a liquid crystal that is in a cholesteric phase.

5. A recording device comprising a display, a photoconductor superposed on the display, a pair of electrodes disposed on the display and photoconductor respectively, wherein at least one of the pair of electrodes is divided into a plurality of sub-electrodes, and the direction of an electric field that is regarded as a vector and induced between the pair of electrodes is oblique to the surfaces of substrates.

6. The recording device as claimed in claim 5, wherein the space between adjoining sub-electrodes is equal to or smaller than 50 µm.

7. The recording device as claimed in claim 5, wherein the display is realized with a liquid crystal that is in a cholesteric phase.

8. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recording devices, wherein the first light source emits light linearly.

9. The recorder as claimed in claim 8, further comprising a scanner for reading characters or information.

10. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recording device, wherein the first light source is movable.

11. The recorder as claimed in claim 10, wherein at least part of the feed members is movable together with the first light source.

12. The recorder as claimed in claim 10, wherein the second light source is movable together with the first light source.

13. The recorder as claimed in claim 10, further comprising an interceptive member capable of intercepting light from the surface of the recording device, wherein the interceptive member is movable together with the first light source.

14. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recording device, wherein the second light source generates light on a planar basis.

15. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recording device, wherein at least one of the pair of electrodes included in the recording device is divided into a plurality of sub-electrodes, and part of the feed members is disposed so that a voltage can be sequentially applied to the plurality of sub-electrodes.

16. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device;

a second light source for resetting a record in the recording device; and a transporting means for transporting the recording device.

17. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recording device, wherein at least part of the feed members is realized with a roller.

18. A recorder for recording information in a recording device that comprises a display, a photoconductor superposed on the display, and a pair of electrodes disposed on the display and photoconductor respectively, the recorder comprising:

feed members via which a voltage is applied to the pair of electrodes included in the recording device;

a first light source for writing information in the recording device; and a second light source for resetting a record in the recoding device, wherein at least part of the feed members is realized with an elastically deformable conductor.

* * * * *